(12) United States Patent
Chu et al.

(10) Patent No.: US 8,775,602 B2
(45) Date of Patent: *Jul. 8, 2014

(54) ALARM-DRIVEN ACCESS CONTROL IN AN ENTERPRISE NETWORK

(75) Inventors: Christopher Chu, Lakewood, CO (US);
Ronald S. Rozensky, Bradenton, FL (US); Robert Rhea Seibel, Waretown, NJ (US); Mukund Sundararajan, Sayreville, NJ (US)

(73) Assignee: Avaya Inc., Basking Ridge, NJ (US)

( * ) Notice: Subject to any disclaimer, the term of this patent is extended or adjusted under 35 U.S.C. 154(b) by 2835 days.

This patent is subject to a terminal disclaimer.

(21) Appl. No.: 11/444,861

(22) Filed: Jun. 1, 2006

(65) Prior Publication Data

US 2007/0283012 A1    Dec. 6, 2007

(51) Int. Cl.
*G06F 15/173* (2006.01)

(52) U.S. Cl.
USPC .......................................................... 709/224

(58) Field of Classification Search
USPC .......................................................... 709/224
See application file for complete search history.

(56) References Cited

U.S. PATENT DOCUMENTS

| | | | |
|---|---|---|---|
| 6,513,129 B1 * | 1/2003 | Tentij et al. ................... | 714/4 |
| 6,898,710 B1 | 5/2005 | Aull | |
| 6,938,171 B1 | 8/2005 | Isomichi et al. | |
| 7,117,529 B1 | 10/2006 | O'Donnell et al. | |
| 2003/0236876 A1 | 12/2003 | Curtin et al. | |
| 2004/0088404 A1 * | 5/2004 | Aggarwal ................... | 709/224 |
| 2005/0010808 A1 | 1/2005 | Wixson et al. | |
| 2005/0060328 A1 | 3/2005 | Suhonen et al. | |
| 2005/0114701 A1 | 5/2005 | Atkins et al. | |
| 2005/0268345 A1 | 12/2005 | Harrison et al. | |
| 2005/0278547 A1 | 12/2005 | Hyndman et al. | |
| 2006/0002401 A1 | 1/2006 | Mukherjee et al. | |
| 2006/0029032 A1 | 2/2006 | Allan et al. | |
| 2006/0069957 A1 | 3/2006 | Ganesh et al. | |
| 2006/0143702 A1 | 6/2006 | Hisada et al. | |

(Continued)

FOREIGN PATENT DOCUMENTS

| | | |
|---|---|---|
| GB | 2433181 | 6/2007 |
| GB | 0704920.8 | 7/2007 |
| WO | 2005032041 A1 | 4/2005 |

OTHER PUBLICATIONS

U.S. Appl. No. 11/294,961, filed Dec. 6, 2005, A.W. Raphael et al., "Secure Gateway with Alarm Manager and Support for Inbound Federated Identity."

(Continued)

*Primary Examiner* — Nicholas Taylor (57) ABSTRACT

An alarm access controller is operative to control access to an enterprise network of a communication system responsive to alarms generated by products that are part of a set of internal resources of the enterprise network. In one aspect, the alarm access controller is implemented by a server or other processing element comprising a processor coupled to a memory. The alarm access controller is configured to receive an alarm from one of the products, to identify an external service provider for handling the alarm, and to provide temporary authenticated access of the service provider to the product. By limiting service provider access to an alarm-generating product in accordance with specified time periods or other conditions determined based at least in part on the alarm itself, system security is considerably improved and access control is made more flexible and efficient.

22 Claims, 2 Drawing Sheets

(56) References Cited

U.S. PATENT DOCUMENTS

| | | | |
|---|---|---|---|
| 2006/0233180 A1* | 10/2006 | Serghi et al. ............... | 370/401 |
| 2006/0256800 A1 | 11/2006 | Harrington et al. | |
| 2007/0028118 A1 | 2/2007 | Brown et al. | |
| 2007/0033139 A1 | 2/2007 | Handler | |
| 2009/0024532 A1 | 1/2009 | Chien-Ming | |

OTHER PUBLICATIONS

Lewney, Dr. Mark, "GB Application No. GB0704920.8 Search Report Jul. 11, 2007", , Publisher: UK IPO, Published in: GB.

Lewney, Dr. Mark, "GB Application No. GB0704920.8 Office Action May 28, 2010", , Publisher: UK IPO, Published in: GB.

, "EX-2500, EX-1500, & EX-750", "Aventail Product Family Data Sheet", 2005, Publisher: Aventail Corporation.

, "Secure Access 2000", "Datasheet", Nov. 2005, Publisher: Juniper Networks, Published in: US.

, "Secure Access 4000", "Datasheet", Nov. 2005, Publisher: Juniper Networks, Published in: US.

, "Secure Access 6000", "Datasheet", Nov. 2005, Publisher: Juniper Networks, Published in: US.

, "Secure Access 6000 SP", "Datasheet", Nov. 2005, Publisher: Juniper Networks, Published in: US.

, "Secure Access 700", "Datasheet", Nov. 2005, Publisher: Juniper Networks, Published in: US.

"Advanced Feature Set—Sophisticated features for complex deployments of Juniper Networks SSL VPN appliances", "Datasheet", Jul. 2005, Publisher: Juniper Networks, Published in: US.

, "Liberty ID-FF Architecture Overview", "Liberty Alliance Project Version 1.2-errata-v1.0", 2005, pp. 1-44.

, "Permeo Base 5", 2005, Publisher: Permeo Technologies, Published in: US.

Lewney, Dr. Mark, "GB Application No. GB0616895.9 Search Report Nov. 1, 2006", , Publisher: UK IPO, Published in: GB.

Maung, Zarni, "U.S. Appl. No. 11/294,961 2nd Notice of Allowance Jul. 6, 2009", , Publisher: USPTO, Published in: US.

Maung, Zarni, "U.S. Appl. No. 11/294,961 Notice of Allowance Feb. 27, 2009", , Publisher: USPTO, Published in: US.

Yuen, Kan, "U.S. Appl. No. 11/535,118 Office Action Oct. 30, 2009", , Publisher: USPTO, Published in: US.

Yuen, Kan, "U.S. Appl. No. 11/535,118 Office Action Mar. 3, 2010", , Publisher: USPTO, Published in: US.

* cited by examiner

ALARM-DRIVEN ACCESS CONTROL IN AN ENTERPRISE NETWORK

RELATED APPLICATION

The present application is related to U.S. Pat. No. 7,590,761 B2, filed Dec. 6, 2005 in the name of inventors A.W. Raphael and R.R. Seibel and entitled "Secure Gateway with Alarm Manager and Support for Inbound Federated Identity," which is commonly assigned herewith and incorporated by reference herein.

FIELD OF THE INVENTION

The invention relates generally to the field of communication systems, and more particularly to techniques used to control access to internal resources of enterprise networks from external servers and other devices.

BACKGROUND OF THE INVENTION

Conventional techniques for controlling access to internal resources of enterprise networks from external servers and other devices may involve, for example, the use of secure sockets layer (SSL) virtual private network (VPN) gateways or other types of secure gateways.

A typical conventional SSL VPN gateway is configured to provide browser-based access to the internal resources of an enterprise network. Such internal resources may comprise servers, computers or other processing devices, from many different vendors, and running a wide variety of different protocols. Inbound transactions directed to the gateway are generally initiated using standard protocols such as hypertext transfer protocol (HTTP) or HTTP secure sockets (HTTPS). In a typical configuration, an SSL VPN gateway may not itself be a firewall, but may instead be located within the enterprise behind the firewall.

Examples of conventional SSL VPN gateways include the SA 700, SA 2000, SA 4000, SA 6000 and SA 6000 SP products commercially available from Juniper Networks, Inc. of Sunnyvale, Calif., USA, the EX-2500, EX-1500 and EX-750 products commercially available from Aventail Corp. of Seattle, Wash., USA, and the Permeo Base5 product commercially available from Permeo Technologies, Inc. of Austin, Tex., USA.

A significant drawback associated with conventional VPN gateways of the type listed above is that it can be difficult to handle alarms generated by internal resources of the enterprise. Such resources often comprise products from multiple vendors. Each vendor may have an external service provider that provides customer support for the products of that vendor. A given service provider may comprise, for example, technicians and expert systems that can process the alarms to resolve whatever problems may exist in the corresponding vendor products. Exemplary expert systems that may be used to process alarms are described in U.S. Pat. No. 7,302,611 B2, B2, filed Sep. 13, 2004 in the name of inventors S. Ganesh et al. and entitled "Distributed Expert System for Automated Problem Resolution in a Communication System," which is commonly assigned herewith and incorporated by reference herein.

Generally, the conventional SSL VPN gateways are not configured to deliver alarms from multi-vendor products that are part of an enterprise network behind the firewall to their associated external service providers outside of the firewall, or to allow the service providers access to the products that generated the alarms. In many cases, a customer may have to call the service provider in order to let them know of a problem that has resulted in an alarm. The customer would then have to provide explicit authorization to allow a technician or expert system of the service provider to gain access to the product in order to resolve the problem.

Also, conventional SSL VPN gateways are typically designed to authenticate single users. It is impractical to authenticate the hundreds or even thousands of technicians that may be associated with the service providers that support the various multi-vendor products in a given enterprise. Service provider technicians may have to use hardware tokens or other similar mechanisms to obtain access to an enterprise network, and each service provider technician would have to use different sets of hardware tokens for each customer, which is impractical and expensive. Moreover, authenticating large pools of multi-vendor service provider technicians can place an excessive burden on the administration, authorization and authentication (AAA) server of a given enterprise, which is clearly undesirable.

The above-cited U.S. Pat. No. 7,590,761 B2 discloses an improved SSL VPN gateway or other type of secure gateway which can provide more efficient handling of alarms from multi-vendor products that are part of the internal resources of an enterprise network.

In an illustrative embodiment, an SSL VPN gateway comprises an alarm manager and provides support for inbound federated identity. The alarm manager receives an alarm from a vendor product that is part of a set of internal resources of the enterprise network, and routes the alarm to an external service provider for processing. The gateway receives from the service provider, responsive to the alarm, a federated identity which encompasses a plurality of technicians, expert systems or other servicing elements of the service provider. The gateway may grant one or more particular servicing elements of the service provider access to the alarm-generating vendor product based on the federated identity.

Despite the considerable advantages provided by the secure gateways disclosed in the above-cited patent application, a need remains for further improvements, particularly with regard to controlling access responsive to alarms generated by products that are part of the internal resources of an enterprise network. For example, conventional arrangements for providing such access outside of the secure gateway context may involve utilizing a network management system to reprogram a router responsive to a received alarm. However, such arrangements are unduly complex, and thus very expensive to implement in practical enterprise networks.

SUMMARY OF THE INVENTION

The present invention in an illustrative embodiment overcomes the above-noted drawbacks of the prior art by providing an alarm-driven access control approach. Generally, an alarm access controller is operative to control access to an enterprise network of a communication system responsive to alarms generated by products that are part of a set of internal resources of the enterprise network.

In one aspect of the invention, the alarm access controller is implemented by a server or other processing element comprising a processor coupled to a memory. The alarm access controller is configured to receive an alarm from one of the products, to identify an external service provider for handling the alarm, and to provide temporary authenticated access of the service provider to the product.

In an illustrative embodiment, the alarm access controller further comprises, by way of example, an alarm severity analyzer, a notice generator, a trouble ticket generator, an authenticator and service-related storage. The alarm severity analyzer is operative to process the alarm to determine its severity. One or more conditions of the temporary authenticated access of the service provider to the product may be determined based at least in part on the severity of the alarm. The notice generator is operative to generate an alarm notification signal for delivery to the identified service provider. The trouble ticket generator is operative to generate a unique identifier of the alarm. The alarm access controller may send the unique identifier of the alarm to the identified service provider in conjunction with an alarm notification. The authenticator can then authenticate the identified service provider responsive to an access request thereof based at least in part on the unique identifier of the alarm.

The service-related storage is operative to store service-related information for respective ones of a plurality of products that are part of the set of internal resources of the enterprise network. The service-related information may comprise, for each of the products, one or more permitted access times for alarm resolution for that product, as well as information identifying one or more corresponding service providers that should handle alarms generated by the respective products. The access times for a given one of the products may be indexed by alarm severity, such that different access times may be determined based on the alarm severity.

The service-related information may further comprise, for at least a given one of the products, information identifying at least one additional product for which access is granted to the identified service provider in conjunction with a grant of access to the given product. As another example, the service-related information may comprise, for at least a given one of the products, information identifying one or more access control managers whose authorization is required to obtain any change in one or more specified conditions of the temporary authenticated access of the service provider to the product. In absence of an alarm generated by the product, the service provider is generally not permitted to access the product without approval of the one or more access control managers associated with that product.

The illustrative embodiments of the invention advantageously overcome one or more of the problems of the prior art. For example, by limiting service provider access to an alarm-generating product in accordance with specified time periods or other conditions determined based at least in part on the alarm itself, system security is considerably improved and access control is made more flexible and efficient.

These and other features and advantages of the present invention will become more readily apparent from the following drawings and detailed description.

DETAILED DESCRIPTION OF THE INVENTION

The invention will be described below in conjunction with an exemplary communication system comprising an enterprise network having a plurality of servers, computers or other processing elements. It should be understood, however, that the invention is not limited to use with any particular type of communication system or any particular configuration of servers, computers or other processing elements of the system. Those skilled in the art will recognize that the disclosed techniques may be used in any communication system application in which it is desirable to provide improved access responsive to internal alarms.

Figure 1:
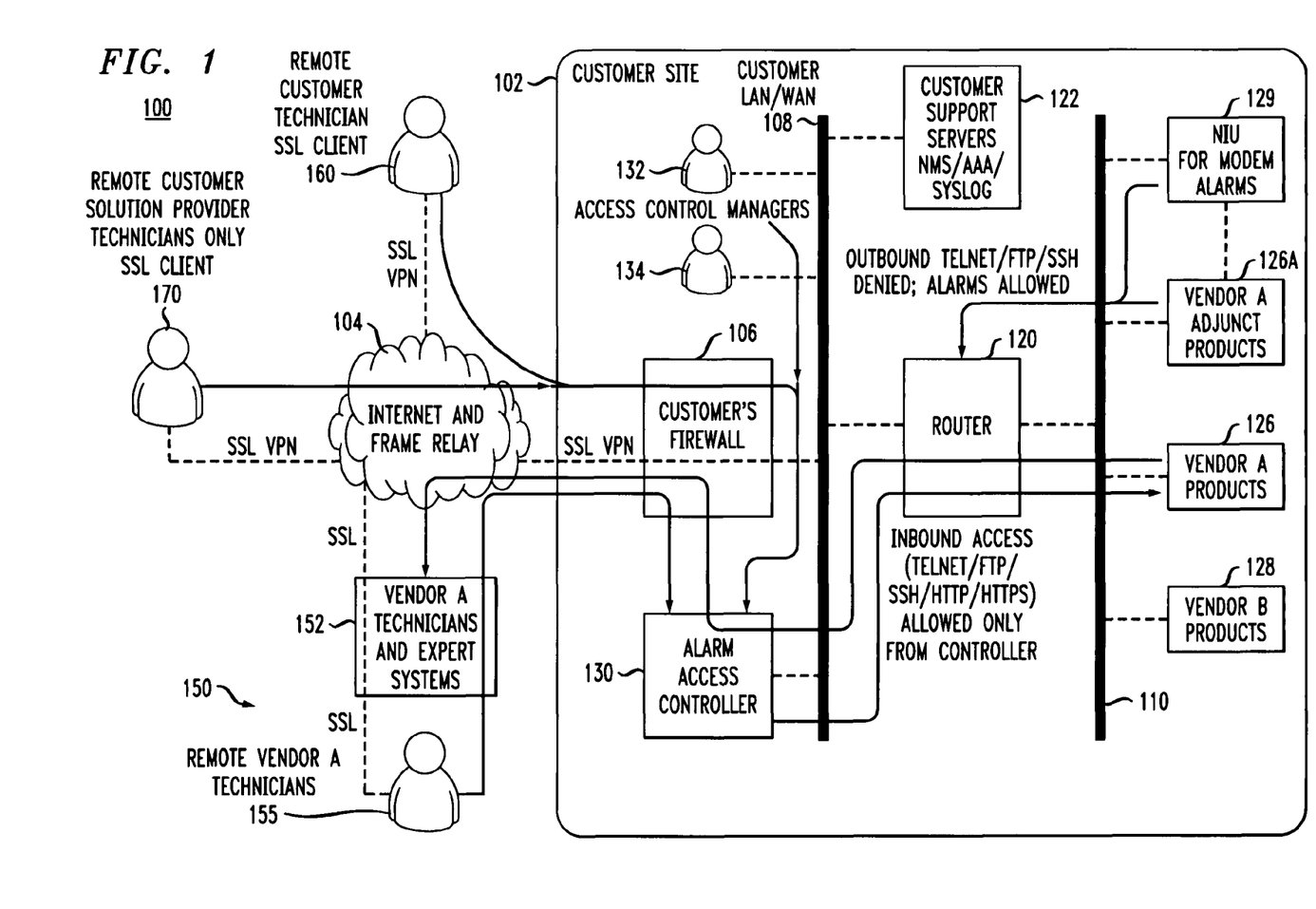
FIG. 1 shows an exemplary communication system comprising an alarm access controller in accordance with an illustrative embodiment of the invention.

FIG. 1 shows an example of a communication system 100 in accordance with an illustrative embodiment of the invention. The system 100 comprises a customer site 102 which is coupled to an external network 104. The customer site 102 comprises an enterprise network that is separated from the network 104 via a firewall 106. The enterprise network in this embodiment comprises network segments 108 and 110, which may comprise local area network (LAN) segments, wide area network (WAN) segments, or other network segments, or portions thereof, in any combination. The network segments 108, 110 are coupled to a router 120.

The router 120 may comprise, for example, an SSL VPN gateway or other secure gateway of the type described in the above-cited U.S. pat. No. 7,590,761 B2, or a conventional router.

The router 120 is also coupled to one or more customer support servers 122, which may comprise, by way of example, a network management system (NMS) server, an AAA server, a system log (Syslog) server, etc. These various servers may be implemented in a single computer or other processing element, or each may comprise a separate, stand-alone processing element or a set of such elements.

The enterprise network in this embodiment further comprises one or more servers or other processing elements 126, 126A and 128. Elements 126 represent computers, servers or other processing elements that are products of a particular vendor denoted as Vendor A. Similarly, elements 128 represent computers, servers or other processing elements that are products of a particular vendor denoted as Vendor B. Elements 126A represent computers, servers or other processing elements that are adjunct products of Vendor A. Such products may comprise, for example, products that are not manufactured or otherwise supplied by Vendor A, but may be supported by that vendor.

The term "product" as used herein is intended to be construed broadly so as to encompass, by way of example, computers, servers or other processing elements as noted above. Such other processing elements may comprise, for example, switches, gateways, routers, firewalls, etc. A given processing element may be, for example, a self-contained piece of equipment, a component of such a piece of equipment, or a combination of multiple such pieces of equipment, and may comprise software, hardware and/or firmware in any combination.

Although not explicitly shown in this example, additional products that are the products of the customer itself, or of numerous other vendors, may also be part of the enterprise network. As another example, all or substantially all of the products within a given enterprise network may be products of only a single vendor. Many other arrangements of products within an enterprise network are possible in a given embodiment of the invention.

The enterprise network associated with customer site 102 in the present embodiment thus has internal resources comprising multi-vendor products 126 and 128, as well as additional internal resources comprising products 126A that are adjunct products of Vendor A. The products 126, 126A and 128 are coupled to the enterprise network segment 110 as shown.

The Vendor A adjunct products 126A may optionally comprise one or more modem ports that are coupled via a network interface unit (NIU) 129 to segment 110 of the enterprise network. Such connections may be used to handle modem alarms generated by the Vendor A adjunct products. The modem alarms are converted via the NIU to Internet protocol (IP) based alarms that can be directed by the router 120 to an alarm access controller 130. The NIU connects, for example, to the modem port of a server or other processing element and translates the modem alarm into an IP based alarm. The NIU is not a requirement of the invention but in the illustrative embodiment provides a more complete solution by accommodating modem alarms.

It should be noted that the term "customer" as used in the context of the illustrative embodiment refers to an enterprise that purchases or otherwise obtains products 126 and 128 from respective vendors A and B, and that may also use one or more of its own products, as well as products from other vendors. Thus, the entity denoted as the customer in this embodiment is a customer of at least the vendors A and B. It is to be appreciated that the invention does not require such a customer arrangement, but is more generally applicable to any business, organization or other enterprise that has internal resources for which external access is controlled responsive to generated alarms as described herein.

Also, it is to be appreciated that a given processing element of the system 100 may itself comprise multiple vendor products. Thus, a given vendor product, as that term is used herein, may comprise, for example, a particular portion of a given processing element, such as a software program running on that element, a hardware component of that element, etc.

The customer site 102 in this embodiment further comprises the alarm access controller 130 coupled to segment 108 of the enterprise network. Associated with the alarm access controller are first and second alarm managers 132 and 134, both also coupled to segment 108 and operative to communicate with the alarm access controller. The alarm access controller will be described in greater detail below with reference to FIG. 3. The alarm managers 132 and 134 may comprise computers or other types of client devices, or more generally other types of processing elements of the customer site.

In other embodiments, the customer site 102 may also include, again by way of example, an SSL client device of a local customer technician. This is a technician that is local to the customer site 102, behind the enterprise network firewall 106, and that supports any customer products of the customer site. A local customer technician SSL client device of this type may be, for example, coupled to the enterprise network segment 108.

The various devices of the customer site 102 need not all be at the same physical facility location. For example, the site may be a distributed site, with certain of the devices being located at different physical facilities.

The external network 104 in this embodiment represents a network supporting Internet and Frame Relay protocols, although other protocols can of course be utilized in implementing the invention. A given external or enterprise network in an embodiment of the invention may comprise, by way of example, a global communication network such as the Internet, an intranet, an extranet, a LAN, a WAN, a metropolitan area network (MAN), a wireless cellular network, or a satellite network, as well as portions or combinations of these or other wired or wireless communication networks. Implementation of the present invention thus does not require any particular type of network or set of networks.

The external network 104 is coupled to service provider 150 associated with Vendor A. The service provider 150 may also be referred to herein as a third-party service provider, since it may constitute entities that are separate from the customer or the product vendors. However, the invention does not require any particular relationship among the customer, service providers and vendors, and the techniques described herein can be adapted in a straightforward manner for application to other types of entities.

Service provider 150 comprises Vendor A technicians and expert systems 152, which are assumed to be located at a common site, and one or more remote Vendor A technicians 155. The service provider may also comprise other elements, such as an authentication database, although such additional elements are omitted from the figure for clarity of illustration. The technicians and expert systems 152, 155 may comprise one or more expert systems, such as, for example, systems of the type described in the above-cited U.S. Pat. No. 7,302,611 B2, as well as one or more technician devices, such as computers, mobile communications devices, etc. which may be used to allow technicians to communicate with customer site 102. As will be described in greater detail below, the service provider 150 is configured to respond to alarms generated by the respective Vendor A and Vendor A adjunct products 126 and 126A, by accessing said products via the router 120 under the control of the alarm access controller 130.

Although not shown in the figure, a similar service provider configuration may be provided for Vendor B, comprising Vendor B technicians and expert systems. The Vendor B technicians may comprise technicians located at the same site as the expert systems, as well as one or more technicians remote from that site.

Such service providers may each have a corresponding federated identity associated therewith, as described in the above-cited U.S. Pat. No. 7,590,761 B2. The federated identities of these respective system elements may be established in accordance with standards of the Liberty Alliance Project, www.projectliberty.org, as described in, for example, Liberty ID-FF Architecture Overview, Version 1.2, which is incorporated by reference herein. Generally, a federated identity combines the authentication information typically required to access multiple network entities on an individual basis, in a manner that allows a user to access all of the entities via a single sign-on using his or her federated identity. Thus, the multiple network entities are federated in that they are associated with one another into a common "circle of trust" that is accessible via the single sign-on. The identity associated with that single sign-on is referred to as a federated identity. The use of federated identity can facilitate alarm response by the service providers. It is to be appreciated, however, that federated identity is not a requirement of the invention, and need not be used in a given embodiment.

Also coupled to the external network 104 in the system 100 of FIG. 1 are SSL client devices 160 and 170 of a remote customer technician and a remote customer solution provider, respectively. Such technicians and solution providers are remote from the customer site 102, outside the enterprise network firewall, and in this example support customer products or other products of that site. The SSL client devices 160 and 170 are coupled to the external network 104 via respective SSL VPNs.

The devices 120, 122, 126, 128, 130, 150, 160 and 170 of system 100 are examples of what are more generally referred to herein as "processing elements."

The router 120 in the illustrative embodiment may be configured, by way of example, to deny or otherwise block certain types of outbound traffic from elements 126, 128, 128A and 129. As a more particular example, outbound Telnet, file transfer protocol (FTP) and/or secure shell (SSH) traffic from these elements may be denied, while outbound alarms are allowed for delivery to the alarm access controller 130. Similarly, the router 120 may be configured to deny or otherwise block certain types of inbound traffic, such as Telnet, FTP, SSH, HTTP, HTTPS, etc. unless such traffic is from the alarm access controller 130. This particular arrangement is not required for implementing the invention, and numerous alternative router configurations and traffic control arrangements may be used.

Figure 2:
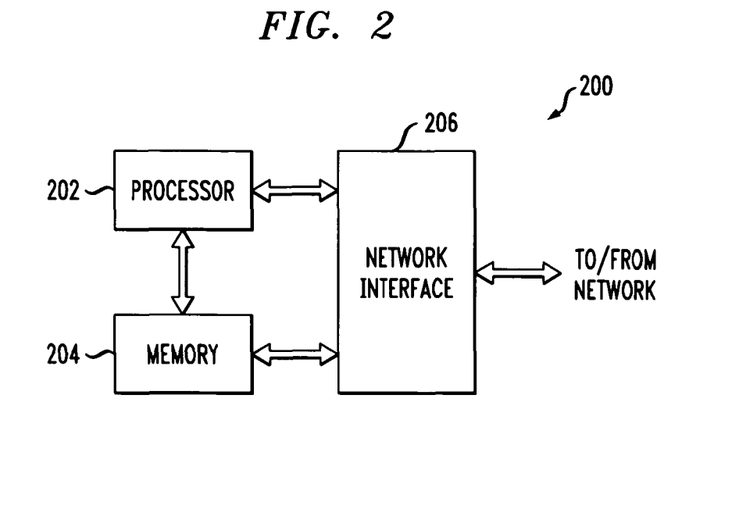
FIG. 2 is a simplified block diagram showing one possible implementation of a given processing element of the FIG. 1 system.

FIG. 2 shows a simplified block diagram of one possible implementation of a given processing element 200 of the FIG. 1 system. The processing element 200 may correspond, by way of example, to the router 120, to the customer support server(s) 122, to one of the products 126, 126A or 128, to the alarm access controller 130, to an element of service provider 150, or to SSL devices 160 or 170. Generally, any such processing element comprises a processor 202 coupled to a memory 204 and one or more network interfaces 206. The techniques of the present invention may be implemented at least in part in the form of software storable in the memory 204 and executable by the processor 202. The memory 204 may represent random access memory (RAM), read-only memory (ROM), optical or magnetic disk-based storage, or other storage elements, as well as portions or combinations thereof.

Those skilled in the art will recognize that the individual components of FIG. 2 as shown for illustrative purposes may be combined into or distributed across one or more processing devices, e.g., a microprocessor, an application-specific integrated circuit (ASIC), a computer or other device(s).

In addition, depending on which of the system devices it implements, the processing element 200 may further include additional components that are not shown in the figure but are typically associated with such a device. For example, a given processing element 200 implementing one or more of devices 120, 122, 126 or 128 may comprise, for example, additional components commonly associated with an otherwise conventional computer, a server, a set of servers, etc. As another example, a given processing element 200 implementing one or more of SSL client devices 160 or 170 may comprise additional components commonly associated with an otherwise conventional mobile communication device such as a mobile telephone, personal digital assistant (PDA) or portable computer, or an otherwise conventional non-mobile communication device, such as a desktop computer, a server or a set of servers, or more generally any other type of processor-based device or set of devices suitably configured for communication with other devices of system 100. The conventional aspects of these and other devices utilizable in system 100 are well known in the art and therefore not described in further detail herein.

The system 100 may include additional elements not explicitly shown in the figure, such as additional servers, routers, gateways or other network elements. The system may also or alternatively include one or more communication system switches, such as a DEFINITY® Enterprise Communication Service (ECS) communication system switch available from Avaya Inc. of Basking Ridge, N.J., USA. As another example, a given communication switch utilizable in conjunction with the present invention may comprise Multi-Vantage™ communication system software, also available from Avaya Inc. The term "processing element" as used herein is intended to include such switches, as well as servers, routers, gateways or other network elements.

It is therefore to be appreciated that the present invention does not require the particular arrangements shown in FIG. 1, and numerous alternative configurations suitable for providing alarm-driven access control and other functionality described herein will be readily apparent to those skilled in the art.

The alarm access controller 130 is configured in the illustrative embodiment to provide improved processing of alarms generated in the system 100. As noted above, conventional arrangements involving the use of network management systems to reprogram routers responsive to received alarms are unduly complex and expensive. The present invention solves this problem of the prior art by providing automated alarm-enabled access control.

Generally, the alarm access controller 130 is configured to control access of external service providers such as 150, 160 and 170 to the products 126, 126A and 128 of the enterprise network of the system 100, responsive to alarms generated by those products. For a given such alarm generated by one of the products or other internal resources of the enterprise network, the alarm access controller identifies an external service provider for handling the alarm, and provides temporary authenticated access of the service provider to the product. Except in particular situations, service provider access is provided only in response to product alarms, which enhances the security of the system and considerably facilitates access control.

Figure 3:
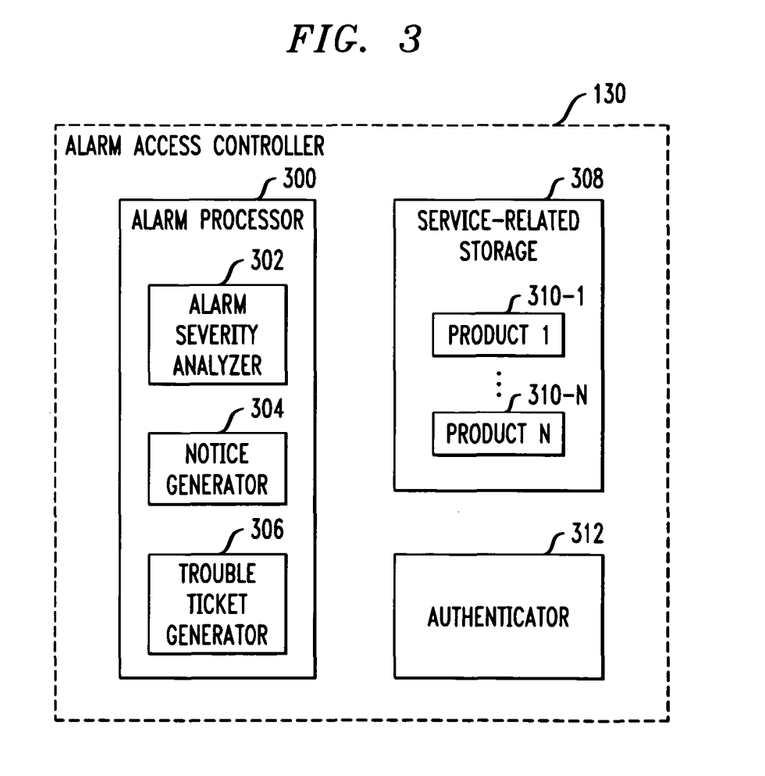
FIG. 3 is a simplified block diagram showing a number of elements of the alarm access controller of the FIG. 1 system in the illustrative embodiment of the invention.

FIG. 3 shows a number of elements of the alarm access controller 130 in the illustrative embodiment. In this embodiment, the alarm access controller comprises an alarm processor 300, which includes an alarm severity analyzer 302, a notice generator 304, and a trouble ticket generator 306. The alarm access controller further comprises service-related storage 308, which includes service-related information 310-1 through 310-N for respective products denoted Product 1 through Product N, and an authenticator 312, which may but need not comprise a federated identity authentication element. The service-related information 310-1 through 310-N may comprise service-related information associated with any of the products 126, 126A or 128 previously described in conjunction with the system 100 of FIG. 1, or other products that represent internal resources of the enterprise network.

The alarm processor 300, and other elements of the alarm access controller 130, may be implemented at least in part using a processor and memory of a processing element of the system, as indicated in the foregoing description of FIG. 2. Also, although elements 308 and 312 are shown as being separate from the alarm processor 300 in the illustrative embodiment, these and other controller elements may be wholly or partially incorporated into the alarm processor 300 in alternative embodiments.

The alarm severity analyzer 302 is operative to process a given alarm to determine its severity, and the resulting severity determination may be used to control, for example, the particular service provider that is notified of the alarm, the period of time for which that service provider will temporarily be permitted to access the alarm-generating product, or other characteristics of the temporary access granted to the service provider by the alarm access controller.

The notice generator 304 generates an appropriate alarm notification signal for delivery to the particular service provider that is selected to handle a given alarm.

The trouble ticket generator 306 generates, for a given alarm, a ticket or other type of record which is used to identify information regarding the given alarm, the service provider selected to handle the alarm, the type and extent of temporary access granted to that service provider, etc. This ticket or other record preferably comprises a unique, one-time number. It may be utilized in authorizing access responsive to inbound access requests received from a service provider selected to handle a given alarm.

The service-related storage 308 may comprise, for each of the N products, a set of allowed access times for alarm resolution for that product, possibly indexed by alarm severity, as well as information associated with one or more corresponding service providers that should handle the alarm(s). The service provider information stored in service-related storage 308 for a given one of the N products may comprise, for example, technician identifier (ID), email address, phone number, pager, instant message (IM) address or other contact information, or an automated tool or other expert system ID and corresponding auto-commit response.

Other types of service-related information 310-1 through 310-N may include protocols required to access particular products, an identification of products that are related to a given alarm-generating product and may also be accessed by a service provider that responds to an alarm generated by the given product, etc.

The service-related information 310-1 through 310-N may identify one or more access control managers, such as access control managers 132 and 134 of system 100, that are authorized to provide real-time access approval for alarms generated by a particular product, or under other conditions. Generally, if no alarm is present, external service provider access is denied to the corresponding product, unless an access manager grants a real-time access approval. This type of "manual override" of the default alarm-driven access control may be appropriate in certain circumstances, such as when a designated service provider for a given product is unavailable. An email address, phone number, pager, IM address or other contact information may be stored for each identified access control manager. The alarm access controller may be pre-programmed by a system administrator to indicate whether access can be granted by a single access control manager or multiple access control managers. If the approval of multiple access control managers is required, the controller ensures that both have approved access before access is granted.

An example of the processing of a given alarm in the system 100 will now be described in greater detail with reference to FIGS. 1 and 3. It should be understood, however, that other types of alarm processing may be used in other embodiments.

The given alarm is sent by one of the products 126, 126A or 128 to the alarm access controller 130 via router 120 and network segments 108, 110. The alarm may be, for example, an IP-based alarm that is generated directly by one of the products, or a modem alarm that is converted to an IP-based alarm by the NIU 129 as previously described. Of course, numerous other types of alarms may be processed using the techniques disclosed herein.

Once the alarm is received by the alarm access controller 130, the alarm severity analyzer 302 determines the severity of the alarm. Utilizing the determined alarm severity in combination with the service-related information 310-i for the corresponding product, the alarm access controller identifies an external technician, expert system or other service provider for handling the alarm, and one or more conditions of the temporary access to be granted to that service provider. Such conditions may include, for example, a single time period for which access will be granted, or multiple time periods for which access will be granted. The alarm access controller may also determine any other related products that are impacted by the alarm and whether or not the selected service provider or other service providers should be granted access to those products in conjunction with servicing of the alarm.

The notice generator 304 generates a notification that is sent by the alarm access controller to the selected external technician, expert system or other service provider specifying the alarm and the time period(s) or other conditions for which access will be granted. The notification may include, for example, an alarm description, the determined alarm severity, available diagnostic information, or any other information that would facilitate the handling of the alarm by the selected service provider.

The trouble ticket generator 306 generates a one-time trouble ticket number that may be sent to the selected external service provider, as part of the alarm notification or as a separate communication. The authenticator 312 utilizes this trouble ticket number in authenticating inbound access requests from the service provider.

The selected service provider may respond back to the alarm access controller with a message acknowledging that access will be made at the specified time(s) and in accordance with any other specified conditions.

At the designated time, the selected service provider submits an access request to the alarm access controller 130. This service provider access request comprises authentication information, such as a service provider federated identity, as well as the above-noted one-time trouble ticket number.

Once authenticated, the service provider is granted access to the alarm-generating product and any relevant related products for the specified time period. After the time period has expired, the access is terminated. As one possible alternative, the service provider could be granted unlimited access until the problem that led to the alarm is resolved and the corresponding trouble ticket closed.

The service provider, or an associated technician, expert system or other servicing element, can use an otherwise conventional web browser, or other access device or mechanism, to gain access to the alarm-generating product via the alarm access controller 130.

If the service provider indicates a need for more time to handle a given alarm, the alarm access controller generates a corresponding real-time access request and sends that request to the appropriate access control manager(s). Based on the response from the access control manager(s), as well as service-related information for the corresponding product, the access request may be granted or denied. If the access request is granted, the service provider is provided with access to the product at issue.

The alarm access controller may be operative to log any and all alarms, access requests, access grants, service provider identities, trouble ticket numbers and any other relevant information for use in auditing and for other purposes.

The illustrative embodiment provides a number of significant advantages relative to conventional practice. For example, by allowing service provider access for limited time periods responsive to particular product alarms, system security is considerably improved. An alarm generated by a server or other product automatically determines what service provider is allowed access to that product, for what amount of time, and what other related servers or other products may also be accessed. If a product has not generated an alarm, external service provider access to that product is not permitted, except for certain exceptional conditions such as an appropriately authorized real-time access request.

The illustrative embodiment also facilitates the handling of alarms from multi-vendor products that are part of the internal resources of an enterprise network, by providing a single point of inbound and outbound access control for all service providers. In addition, the illustrative embodiment provides compatibility with customer security policies, e.g., policies associated with access, monitoring, control, logging, etc. Using the techniques of the invention, customers will no longer have to call an external service provider in order to let them know of a problem that has resulted in an alarm, or provide explicit authorization to allow a particular technician or expert system of the service provider to gain access to the product in order to resolve the problem.

In alternative embodiments, the alarm access controller 130 may be incorporated into one or more other system elements. For example, the alarm access controller could be incorporated into router 120 or firewall 106. As another alternative, the alarm access controller could be incorporated into an SSL VPN gateway or other type of secure gateway.

Also, the particular location of the alarm access controller within the system may be varied. For example, a stand-alone processing element implementing the alarm access controller could be coupled to router 120, to customer support servers 122, or coupled to network segment 110 rather than network segment 108 as shown in FIG. 1.

The alarm access controller 300 in the illustrative embodiment may be configured to handle alarms generated by products which use different protocols. Although not explicitly shown, a protocol converter may be used to handle communications in accordance with the various supported protocols. For example, the alarm access controller may convert a given alarm into simple network management protocol (SNMP) for local distribution to the customer support server 122. As another example, the alarm access controller may convert a given alarm into SSL encoded SNMP to send to one of the external third-party service providers 150, 160 or 170. The invention does not require any particular alarm protocol or transmission protocol, and numerous appropriate arrangements will be readily apparent to those skilled in the art.

As noted previously, the authentication of a given service provider may involve use of a federated identity. For example, service provider 150, 160 or 170 may use a federated identity to gain access to the alarm-generating product via the alarm access controller 130. In such an arrangement, the authenticator 312 is configured to authenticate the proffered federated identity. The federated identity in such an arrangement may encompass all of the technicians and expert systems associated with the service provider. Such technicians and expert systems are examples of what are more generally referred to herein as "servicing elements" of the service provider. Thus, the alarm access controller in such an arrangement need only authenticate the service provider, rather than each technician or expert system on an individual basis.

The inbound federated identity of a given service provider 150, 160 or 170 may be provided using the security assertion markup language (SAML) of OASIS, www.oasis-open.org, as described in, for example, SAML Version 1.0, SAML Version 1.1 and SAML Version 2.0, all of which are incorporated by reference herein. Other protocols can also or alternatively be used, such as extensible markup language (XML), simple object access protocol (SOAP), etc.

One or more of the processing functions described above in conjunction with the illustrative embodiments of the invention may be implemented in whole or in part in software utilizing processor 202 and memory 204 associated with one or more processing elements of the system. Other suitable arrangements of hardware, firmware or software may be used to implement the techniques of the invention.

It should again be emphasized that the above-described arrangements are illustrative only. Thus, it is to be appreciated that the particular elements, processing operations, communication protocols and other features shown in the figures are presented by way of example only, and should not be viewed as requirements of the invention. For example, alternative embodiments may utilize different processing element configurations, different processing operations, and different communication protocols than those of the illustrative embodiments. These and numerous other alternative embodiments within the scope of the following claims will be apparent to those skilled in the art.

What is claimed is:

1. An apparatus for use in a communication system, the apparatus comprising:
at least one processing element comprising a processor coupled to a memory, the processing element implementing an alarm access controller operative to control access to an enterprise network of the system;
wherein the alarm access controller is configured to receive an alarm from a product that is part of a set of internal resources of the enterprise network, to identify an external service provider for handling the alarm, and to provide temporary authenticated access of the service provider to the product.

2. The apparatus of claim 1 wherein the alarm access controller further comprises an alarm severity analyzer operative to process the alarm to determine its severity, wherein one or more conditions of the temporary authenticated access of the service provider to the product are determined based at least in part on the severity of the alarm.

3. The apparatus of claim 1 wherein the alarm access controller further comprises a notice generator operative to generate an alarm notification signal for delivery to the identified service provider.

4. The apparatus of claim 1 wherein the alarm access controller further comprises a trouble ticket generator operative to generate a unique identifier of the alarm.

5. The apparatus of claim 4 wherein the alarm access controller is operative to send the unique identifier of the alarm to the identified service provider in conjunction with an alarm notification.

6. The apparatus of claim 4 wherein the alarm access controller comprises an authenticator operative to authenticate the identified service provider responsive to an access request thereof based at least in part on the unique identifier of the alarm.

7. The apparatus of claim 1 wherein the alarm access controller comprises service-related storage for storing service-related information for respective ones of a plurality of products that are part of the set of internal resources of the enterprise network.

8. The apparatus of claim 7 wherein the service-related information comprises, for each of the products, one or more permitted access times for alarm resolution for that product, as well as information identifying one or more corresponding service providers that should handle alarms generated by that product.

9. The apparatus of claim 8 wherein the access times for a given one of the products are indexed by alarm severity, such that different access times may be determined based on the alarm severity.

10. The apparatus of claim 7 wherein the service-related information comprises, for at least a given one of the products, information identifying at least one additional product for which access is granted to the identified service provider in conjunction with a grant of access to the given product.

11. The apparatus of claim 7 wherein the service-related information comprises, for at least a given one of the products, information identifying one or more access control managers whose authorization is required to obtain any change in one or more specified conditions of the temporary authenticated access of the service provider to the given product.

12. The apparatus of claim 11 wherein in the absence of an alarm generated by the given product the service provider is not permitted to access the given product without approval of the one or more access control managers associated with that product.

13. The apparatus of claim 1 wherein the enterprise network is associated with a customer site, and the set of internal resources of the enterprise network comprises at least a plurality of products from a first vendor, and a plurality of products from a second vendor, wherein the alarm access controller is operative to permit a first service provider to access one of the products from the first vendor responsive to an alarm generated by that first vendor product, and to permit a second service provider to access one of the products from the second vendor responsive to an alarm generated by that second vendor product.

14. The apparatus of claim 1 wherein the service provider accesses the product utilizing a federated identity.

15. The apparatus of claim 1 wherein the service provider comprises at least one of a technician and an expert system.

16. The apparatus of claim 1 wherein the alarm access controller is implemented at least in part in the form of software running on the processor.

17. The apparatus of claim 1 wherein the set of internal resources of the enterprise network comprises a plurality of products all from a single vendor.

18. A system comprising:
an enterprise network comprising a set of internal resources including at least one product; and
an alarm access controller operative to control access to the enterprise network;
wherein the alarm access controller is configured to receive an alarm from the product, to identify an external service provider for handling the alarm, and to provide temporary authenticated access of the service provider to the product.

19. A method for use in controlling access to an enterprise network of a communication system, the method comprising the steps of:
receiving an alarm from a product that is part of a set of internal resources of the enterprise network;
identifying an external service provider for handling the alarm; and
providing temporary authenticated access of the service provider to the product.

20. The method of claim 19 wherein the receiving, identifying and providing steps are implemented at least in part in software running on a processing element of the system.

21. The method of claim 19 wherein the enterprise network further comprises at least one of a router and a firewall.

22. An article of manufacture comprising a machine-readable storage medium that is non-transitory and comprises software code, wherein the software code when executed by a processing element of the system performs the steps of the method of claim 19.

* * * * *